United States Patent

[11] 3,597,739

[72] Inventor Maria C. Kolatis Red Bank, N.J.
[21] Appl. No. 482,461
[22] Filed Aug. 25, 1965
[45] Patented Aug. 3, 1971
[73] Assignee Bell Telephone Laboratories, Incorporated New York, N.Y.

[54] METHOD FOR OPERATING A DATA PROCESSOR
9 Claims, 3 Drawing Figs.

[52] U.S. Cl. .......... 340/172.5
[51] Int. Cl. .......... G06f 9/12
[50] Field of Search .......... 340/172.5; 235/157

[56] References Cited

OTHER REFERENCES

IBM Reference Manual, 1401 Data Processing System, A24-1403-1, 1960, International Business Machines Corporation, White Plains, New York, page 33

Wegner, P., An Introduction To Symbolic Programming, 1963, Charles Griffin & Company Ltd., 42 Drury Lane, London, W.C. 2, pp. 1— 219, Scientific Library No. QA, 76.5, W4

*Primary Examiner*—Raulfe B. Zache
*Attorneys*—R. J. Guenther and James Warren Falk

ABSTRACT: A stored program data processor having a memory unit for storing data words and instructions is disclosed. In the operation of the data processor it is from time to time necessary to store groups of data words in various locations in the memory and periodically to process such stored data. However, not all the locations will always have had data stored therein at the beginning of the period allocated for processing such data. A method of operating the data processor is disclosed which involves storing a modifiable operation code and a transfer address in one word of each of the groups. This method permits the data in the group of locations to be processed only when the group in fact contains such data. When the group of locations has no data to be processed the transfer address is employed to indicate another group of locations which may have data to be processed.

PATENTED AUG 3 1971 3,597,739

SHEET 1 OF 3

INVENTOR
M. C. KOLATIS
BY M L Rackman
ATTORNEY

METHOD FOR OPERATING A DATA PROCESSOR

This invention relates to methods for operating a data processor, and more particularly to a method requiring relatively little time to process certain data.

In many data processors it is necessary in each time interval in a repetitive series, e.g., once every 5 milliseconds, to operate on a sequence of groups of data words. Consider for example a data processor which is used to control the operation of a telephone central office. The processor must control the operations of the many peripheral units. To determine the states of the various units, many elements must be scanned. For example, lines must be scanned for service requests. A group of data words in the system memory may be associated with each scan point and the information in any group may be updated following each scan. After the information is updated, the data processor operates upon it to determine the commands to be transmitted to the peripheral units.

Each group of data words pertains to a different scan point. The group contains not only data which is updated but instructions as well. The instructions are often transfers to various subroutines. For example, consider a sequence of 1,000 groups of locations, each associated with a different scan point. During a scanning operation the data in a particular group may be updated. At a later time the data in the group is processed. It is impractical to include the instructions of the subroutine which processes the data in the group of locations containing the data because the subroutine would be repeated 1,000 times in memory. It is more convenient to include in each group an instruction to transfer to a single subroutine which controls the processing of the data.

Thus once a transfer out of a main program is made to a group of data and instruction words associated with a scan point, the data having been previously updated, the data and instruction words in the group may control a transfer to a subroutine for processing the data. However very often the data in the group will not have been changed since the previous transfer to the group of data and instruction words. In such a case, there may be no need to process the data. The machine returns to the main program which instructs it to transfer once again to another group of memory locations to determine if the data in this group must be processed. The difficulty with such a procedure is that a transfer must be made out of the main program to each group of data and instruction words and another transfer made back to the main program even when the data in the group needs no processing. Not only are two transfers required but in addition the machine must test the data in the group to determine if it has been updated since the last examination. Considerable time may thus be wasted; the problem is aggravated when there are relatively few groups containing data which must be processed.

In the copending application of R. L. Brass, Ser. No. 482,564, filed Aug. 25, 1965 now U.S. Pat. No. 3,416,138, there is disclosed an improved method for controlling the processing of data in those groups requiring it. As will be described below, each group of data words is provided with a respective instruction word. When data is first written in a group, the instruction word is modified and when the data in the group has been completely processed, the instruction word is changed back to its original form. An examination of the instruction word directly controls the processing of the data in a group if processing is required. While this technique allows the machine to rapidly determine whether the data in a particular group requires processing, the method requires certain records to be maintained and updated. These records include not only the updating of instruction words but in addition the maintenance of a list of idle groups, which list must be updated each time data is first written into a group and each time it is determined that the data in a group has been completely processed.

It is a general object of this invention to provide a method for determining which groups of data in a data processor require processing which requires a minimum amount of "-bookkeeping" time.

In the Brass invention a series or list of instruction words is included in the memory, each of which contains a no-operation (NO–OP) or transfer (TSF) operation code. In most program-controlled machines successively addressed instructions are normally executed in sequence. If an instruction contains a NO–OP operation code, the machine merely skips over it to the next instruction. If an instruction contains a transfer operation code, the machine transfers to the instruction contained in the location whose address follows the operation code in the transfer instruction. Each of the instructions in the list under consideration initially contains a NO–OP operation code followed by a transfer address. The transfer address of the first instruction in the list is the address of the location containing the first word in the first group; the transfer address in the second instruction is the address of the location containing the first word in the second group, etc. Of course, as long as the operation code represents a NO–OP order the transfer address in the instruction is ignored by the machine.

When a particular scan point is scanned to derive data which must be processed, the data is written in the respective group of memory locations. At the same time the respective instruction word in the NO–OP/TSF list is changed so that its operation code now represents a transfer order rather than a NO–OP code. At the beginning of each time interval during which the various groups of data words must be processed, the main program transfers to the first instruction in the NO–OP/TSF list. If no data has been previously stored in the first group of memory locations, the operation code of the first instruction in the list still represents a NO–OP order. The machine merely skips over the first instruction in the list and moves on to the second. Thus the transfer to the first group and the transfer back to the main program are avoided and in addition the data in the group need not be tested to determine if it must be processed. In just one step the machine proceeds to the second instruction in the NO–OP/TSF list. If this instruction also contains a NO–OP operation code, the machine proceeds to the third instruction in the list. Suppose that since the last examination of this instruction, data which must be processed has been written in the third group of memory locations. When the data was written in the group, for example, by a scan program, the operation code in the third instruction in the NO–OP/TSF list was changed from a NO–OP order to a transfer order. When this instruction is now examined, it represents an order to followed to the instruction contained in the first location in the third group. This instruction in the third group is followed by other instructions and the data which must be processed. The instructions are typically transfer instructions which call for various subroutines to process the data. After the data is processed and perhaps updated, and after commands are transmitted or at least prepared for transmission to the peripheral units, the machine returns to the fourth instruction in the NO–OP/TSF list. This process continues until the last NO–OP/TSF instruction in the list is examined and a transfer is made to the last group if the operation code represents a transfer order. After the data in the last group is processed, or if a transfer is not made to the last group immediately after the last instruction in the NO–OP/TSF list is examined, a transfer is made back to the main program, the machine having processed the data in each group requiring processing.

The great advantage of the scheme is that it is not necessary to transfer from the main program to a group of data and instruction words, to examine the data contained in the group and to then transfer back to the main program if the group contains no information which must be operated upon. By providing the NO–OP/TSF list and examining this list to determine which groups contain data which must be processed, it is possible to effectively "examine" the data in a group by executing a single NO–OP order. As long as the data in a group must be processed the respective instruction in the NO–OP/TSF list is left with a transfer operation code. The data may be processed during a number of succeeding cycles and as long as the processing is not terminated the TSF operation code is left in the respective instruction in the list. Eventually, during one of the time intervals when the various groups of data are processed, the machine determines that no further processing on a particular group is required. For example, if the data represents dial pulse information and the machine determines that all of the required digits have been received, it proceeds to prepare a connection through the telephone switching network. Since the dial pulse information in the group of memory locations has been completely processed, it is no longer necessary to transfer to the group when the successive instructions in the NO–OP/TSF list are subsequently examined. For this reason when the machine, while processing the data in a group, determines that additional processing is not required, it changes the operation code in the respective instruction in the NO–OP/TSF list from a transfer order to a NO–OP order. The next time the instructions in the list are sequentially examined the machine skips over the respective instruction and a transfer is not made to the respective group. During a subsequent scan the machine may detect the origination of another service request. The same group of memory locations may now be assigned to the new call for representing the dial pulse information. Since the data in the group must once again be processed, when the group is initially assigned to the new call the respective instruction in the NO–OP/TSF list is once again changed from a NO–OP order to a TSF order.

Rather than examining each group of data and instruction words when it is time to process the data in the groups, it is only necessary in the Brass invention to directly execute the respective instruction, a NO–OP or TSF order, in the NO–OP/TSF list. It is necessary, however, to change the instructions in the list. A NO–OP operation code must be changed to a transfer operation code when data to be processed is first written into a group of memory locations. The transfer operation code must be changed back to a NO–OP operation code when it is determined that the data has been completely processed. The time spent in changing the instruction, however, is far less than the time spent in the prior art in examining the groups of data to determine if they must be processed. In accordance with another aspect of the Brass invention, the time spent in changing the operation codes in the NO–OP/TSF list back and forth is reduced to a minimum. In prior art machines, there is no predesigned relationship between the operation codes representing NO–OP and transfer orders. If the method of the Brass invention is utilized in prior art machines, in changing a NO–OP operation code to a transfer operation code and vice versa it may be necessary to change many and perhaps all of the bits in the operation code. In many data processors in order to change a data or instruction word in memory it is necessary to first place the word in a register, to change the necessary bits in the register and to then write the new register word in the same location in the memory to replace the old word. Certain prior art machines are equipped with a special instruction which controls a change in only 1 bit in a special one of the system registers. While these machines include instructions which can change any number of bits in a register, the special instruction may be executed in less time since only 1 bit must be changed. In the Brass invention the operation codes for the NO–OP and transfer orders differ in only 1 bit. The NO–OP operation code contains all 0's; the TSF operation code contains all 0's except 1 bit which is a 1. Thus to change the operation code in a word in the NO–OP/TSF list, the word is placed in a special register, which register is the one to be used when the special instruction which controls the modification of a single bit is executed. Each time the operation code must be changed, because the two codes differ in only 1 bit, the special instruction may be utilized for changing the operation code in a minimum amount of time.

When the data processor derives data which must be subsequently processed NO–OP/TSF must do three things. First, it must select an "idle" group of memory locations and write the data in it. Second, it must update the record of idle groups in order that the same group not be selected the next time data is written in one of the groups. Third, it must change the respective instruction in the NO–OP/TSF list from representing a NO–OP code to a transfer code. It is possible to maintain a "directory" in the memory which identifies the location of the NO–OP/TSF instruction for each of the data word groups. The directory might also indicate which groups are idle. This technique, however, "wastes" a large area of the memory especially where the number of the groups is in the thousands. In the Brass application another technique is shown which may be used to maintain an up-to-date record of available groups of memory locations. Since a "directory" is not used in order to determine which NO–OP/TSF instruction is associated with a selected group some extra instructions must be executed. Because there is no correspondence between the addresses of the groups and the addresses of the NO–OP/TSF entries it is not possible to rapidly determine the address of the NO–OP/TSF instruction which must be changed when data is first written into a selected group.

After the data in a group is completely processed it is necessary to do two things. First, the TSF instruction must be changed to a NO–OP instruction. Secondly, the group of memory locations which contain the data which has just been processed must be made available for new data. The machine knows the address of the NO–OP/TSF instruction. However, there is no record readily available which indicates the address of the associated group of memory locations. For this reason, in order for the machine to make the group available for new data, a few extra instructions must be executed to determine the address of the group.

In accordance with my invention it is not necessary to execute the extra instructions required for bookkeeping purposes. The various groups of memory locations are not randomly distributed throughout the memory nor is the NO–OP/TSF list separated from the groups. Instead, the groups are stored in succession and the first location in each group contains the respective N–OP/TSF instruction. Thus, there is no identifiable "list" of NO–OP/TSF instructions. The instruction heading each group contains a transfer address which is the address of the NO–OP/TSF instruction heading the succeeding group. The NO–OP and TSF instructions are used in a manner converse to that in which they are used in the Brass application. A NO–OP instruction indicates that the respective group contains data which must be processed and the TSF instruction indicates that it does not. When it is time to process the data, a transfer is made to the NO–OP/TSF instruction which heads the first group. This instruction normally represents a transfer order, not a NO–OP order as in the Brass application, and if no data has been written into the first group the first instruction controls a transfer to the NO–OP/TSF instruction which heads the second group. If the second group also contains no data which must be processed its head location contains an instruction which controls a transfer to the NO–OP/TSF entry of the third group, etc. When data is written in a group the respective transfer instruction which heads the group is changed to a NO–OP order. In such a case when the respective instruction is examined it does not control a transfer to the next group but instead allows the machine to pass on and execute the instructions in the group itself, which instructions control the processing of the data in the group. After the data in the group has been completely processed the NO–OP instruction which heads the group is changed back to a transfer instruction in order that the machine transfer over the group and proceed to the next, the next time the processing program is executed.

The main advantage in my program is that the address of the NO–OP/TSF instruction for each group is easily determined. When the machine first writes data into a group of memory locations the address containing the transfer instruction to be changed to a NO–OP order is easily determined since this instruction is stored in the very first location of the group.

Similarly, when the data in a group has been completely processed and the respective NO–OP instruction must be changed to a transfer instruction, the address of the instruction is immediately available since the instruction is contained in the very first location of the group. As will become apparent below, the use of the NO–OP and TSF instructions in a manner opposite to that disclosed in the Brass application with my memory layout allows each NO–OP and TSF instruction to be changed by executing three or four fewer instructions (three for a TSF to NO–OP change, four for a NO–OP to TSF change). This results in a saving of seven instruction executions for each data group which must be processed.

It is a feature of this invention to provide a series of successive groups of data and instruction words, each of which groups may or may not contain data which must be processed, with the first word in each group containing a NO–OP or transfer operation code and a transfer address which is the address of the first word in the succeeding group.

It is another feature of this invention to change a transfer operation code to a NO–OP operation code, when data to be processed is first written in a group of data and instruction words, in the first word in the group.

It is another feature of this invention to change a NO–OP operation code to a transfer operation code, when it is determined that the data in a respective group has been completely processed, in the first word in the group.

It is still another feature of this invention to transfer to and execute the instruction contained in the first location in the first group when it is time to process the data in groups requiring processing.

Further objects, features and advantages of the invention will become apparent upon consideration of the following detailed description in conjunction with the drawing in which.

Figure 1:
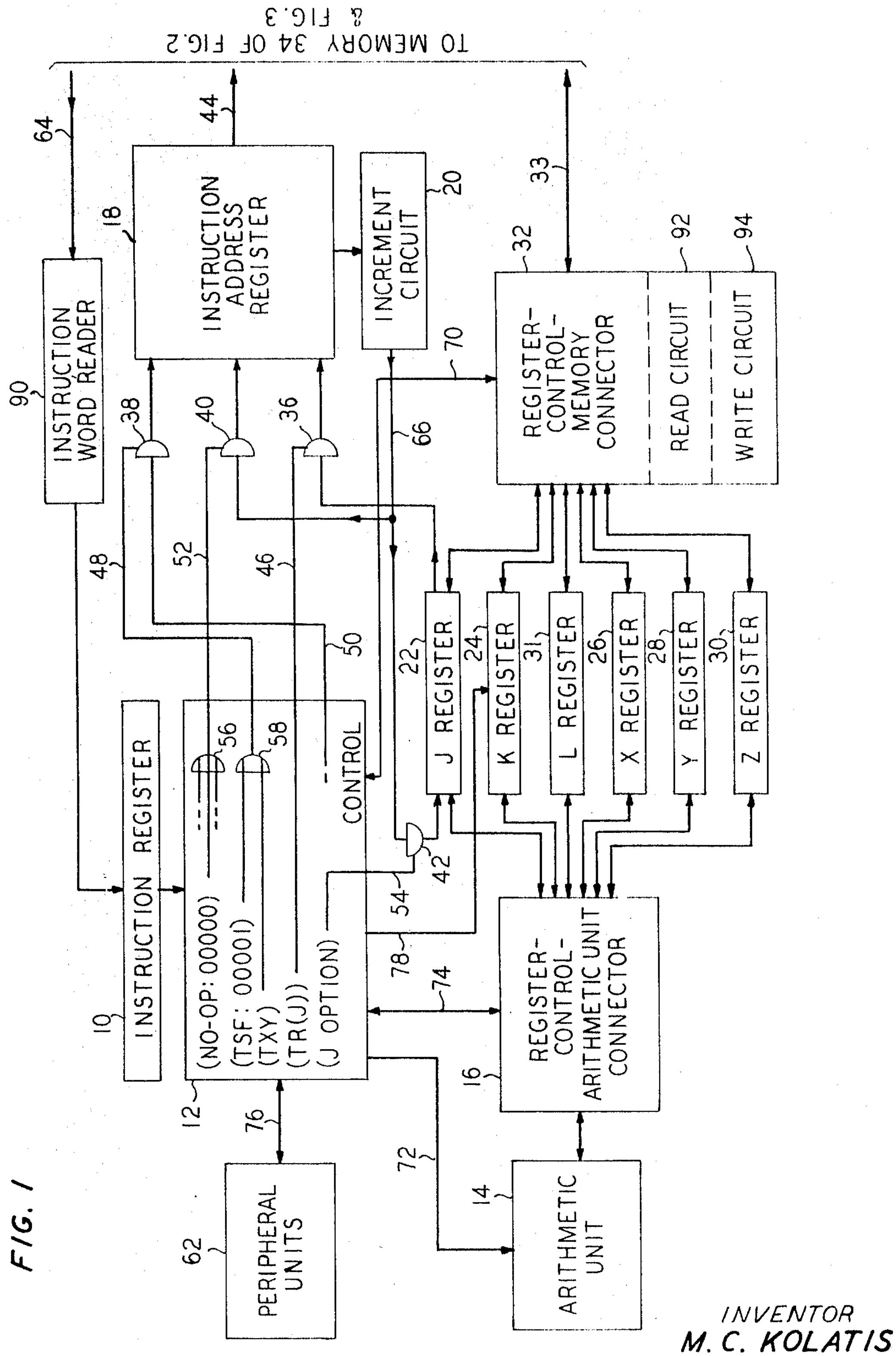
FIG. 1 and FIG. 2 show portions of an illustrative data processor capable of being operated according to the method of the present invention.
Figure 2:
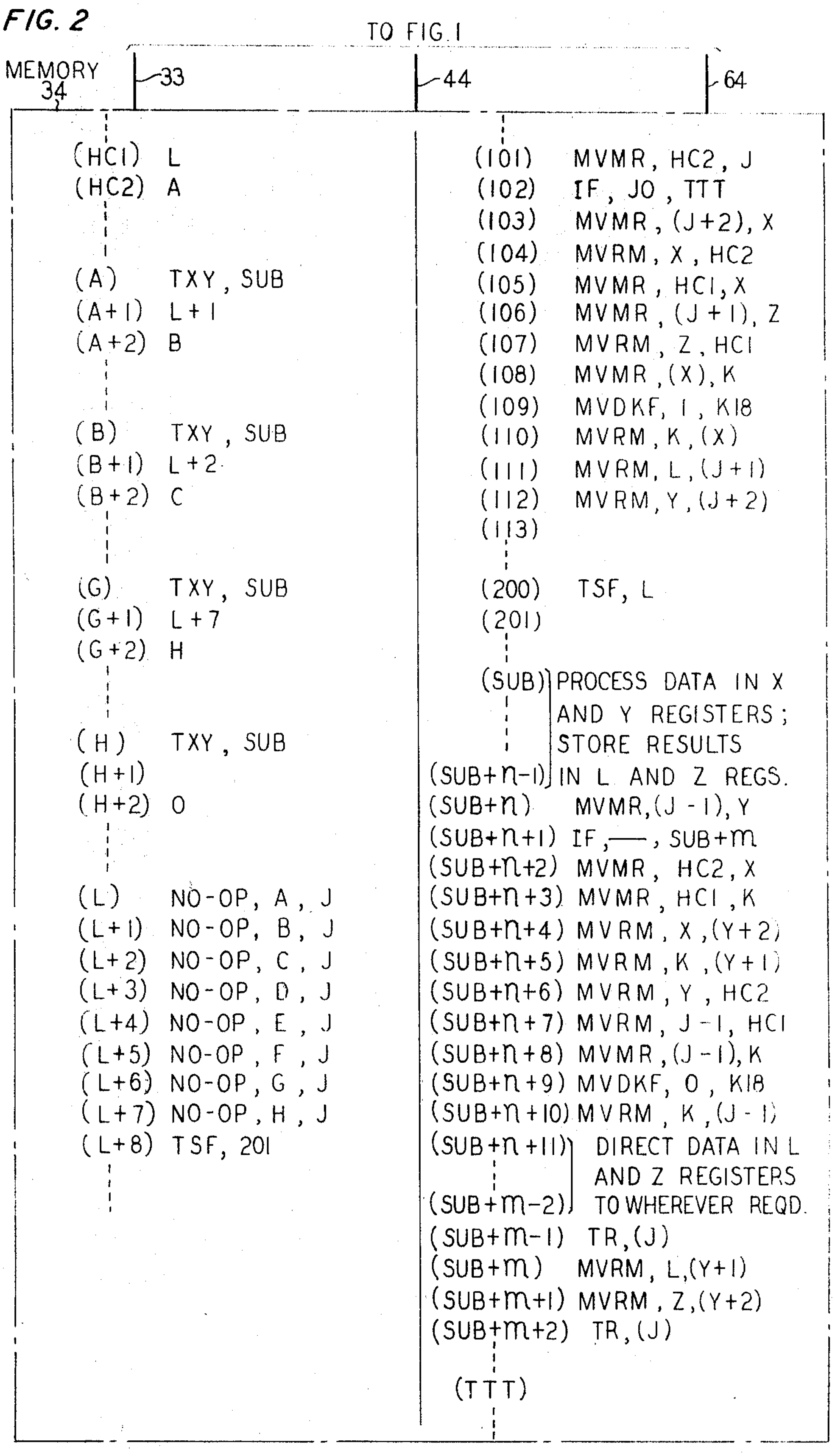
Figure 3:
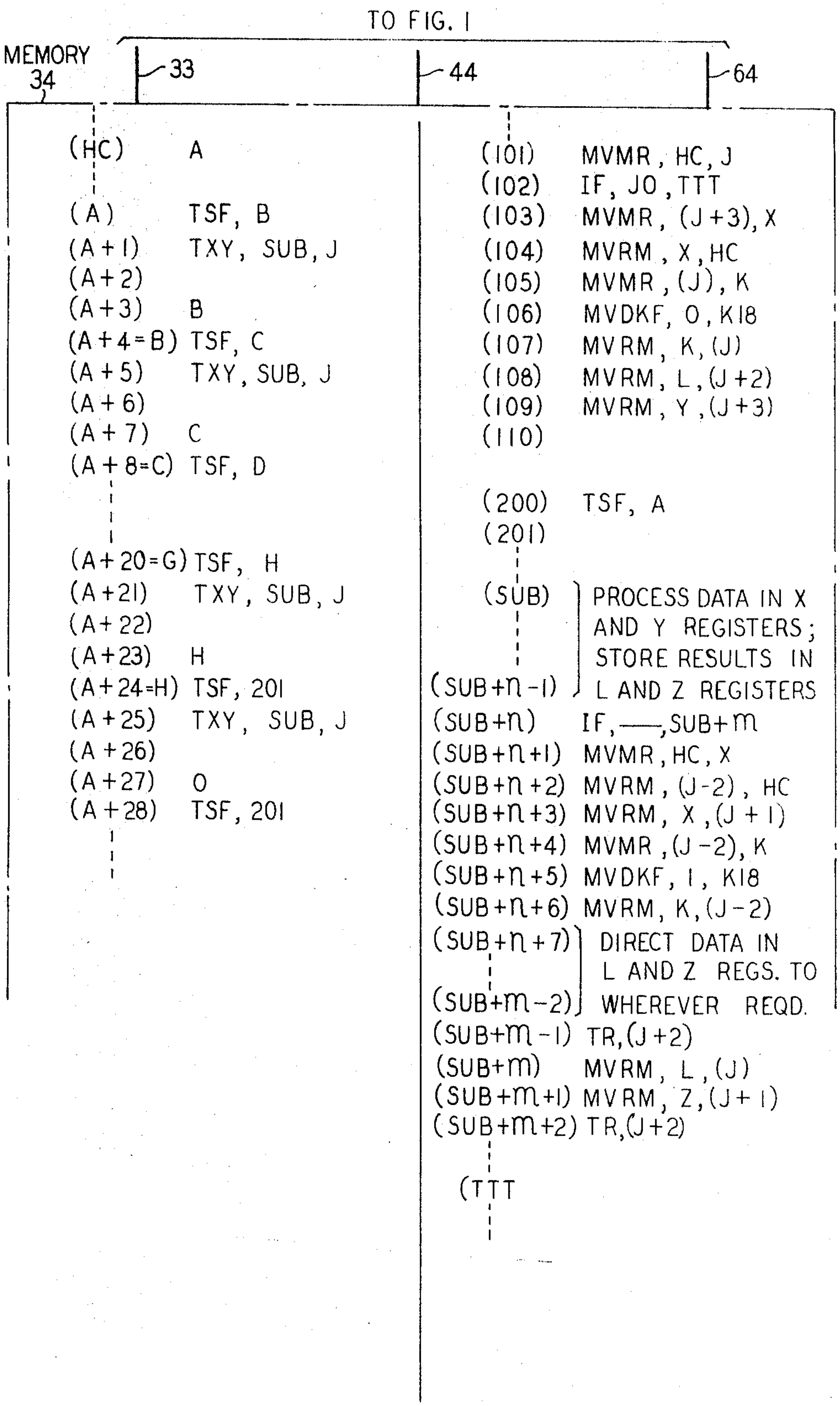
FIG. 3 shows the memory 34 (FIG. 2) modified to store the processing steps employable in performing the process of the present invention.

The program of my invention may be used on the same data processor disclosed in the Brass application. Memory 34 contains both the instruction words which control the operation of the data processor as well as the data words which are operated upon. In FIGS. 2 and 3 various instruction and data words are shown. The address of each of these words is shown in parentheses to the left of the word. (Throughout this description location numbers, or addresses, are shown in parentheses.) The data and instruction words shown in the memories are by no means exhaustive and it is to be understood that the memories contain additional words, the only words shown being those required for an understanding of the Brass and my inventions.

Successively addressed instruction words are transmitted to instruction register 10 by instruction word reader 90. The instructions are interpreted by control 12 which governs the system operation. The address of the next instruction to be transmitted to instruction register 10 is contained in instruction address register 18. The address is transmitted to memory 34 from instruction address register 18 over cable 44. Reader 90 then retrieves the instruction at the respective address over cable 64 and places it in instruction register 10. Increment circuit 20 adds 1 to the number stored in instruction address register 18. The incremented address is applied by increment circuit 20 to cable 66. Gate 40 is normally disabled and the incremented address is not transmitted through this gate to instruction address register 18. When conductor 52 is pulsed, however, the incremented address is transmitted to the instruction address register through gate 40. Thus during normal operation successively addressed instructions are transmitted from memory 34 to instruction register 10.

When a transfer order is executed an out-of-sequence address is stored in instruction address register 18. In executing a (TSF or TXY) transfer order control 12 causes the transfer address to be applied to cable 50 and at the same time causes conductor 48 to be pulsed. The energization of conductor 48 enables gate 38. With gate 38 enabled the transfer address on cable 50 is stored in instruction address register 18. This address is transmitted to memory 34 and it is this address which is thereafter incremented by increment circuit 20.

A J option is available on transfer orders. When a transfer is made from the instruction at a particular address, it is often necessary to subsequently return to the instruction at the succeeding address. For this reason if the J option is used on a transfer order the succeeding address is stored in J register 22. The incremented address appears on cable 66 which is connected to the input of gate 42. When a transfer order is executed conductor 48 is pulsed to enable gate 38, and the transfer address on cable 50 is stored in instruction address register 18. The address on cable 66, however, is in the incremented value of the address initially contained in instruction address register 18. If the J option is used, conductor 54 is pulsed, gate 42 is enabled, and the incremented address passes through gate 42 to be stored in J register 22. At a subsequent time when control 12 determines that it is necessary to return to the program at the point from which the transfer was previously effected, conductor 46 is pulsed to enable gate 36. The return address previously stored in J register 22 is transmitted through gate 36 to the instruction address register. It is this address which is thereafter incremented by increment circuit 20.

The system includes various registers 22, 24, 26, 28, 30 and 31, respectively, designated the J, K, X, Y, Z and L registers. In accordance with the instructions interpreted by control 12 signals are transmitted between the control and register-control-memory connector 32 over cable 70. Register-control-memory connector 32 controls the transfer of data between memory 34 and the system registers. The connector includes a read circuit 92 for reading data words out of the memory and a write circuit 94 for writing data words in the memory. Arithmetic operations are performed in arithmetic unit 14, this unit operating in accordance with signals received from control 12 over cable 72. Signals are also transmitted back and forth between control 12 and register-control-arithmetic unit connector 16 over cable 74. In accordance with signals transmitted over cable 74, selected register words are transferred from the system registers to arithmetic unit 14 where they are processed in accordance with the command signals on cable 72. Data derived by arithmetic unit 14 is transmitted through register-control-arithmetic unit connector 16 to be stored in selected ones of the system registers. The results of the operations performed by the arithmetic unit may be sent to control 12 over cable 74. In accordance with the signals transmitted to control 12 over cable 74 and in accordance with orders contained in the instruction word in register 10 commands are transmitted back and forth over cable 76 between the control and the peripheral units 62. The peripheral units include input/output equipment and any other equipments controlled by the system.

In order to change a word stored in memory 34, it is first transmitted through register-control-memory connector 32 to one of the system registers. It is then transmitted through register-control-arithmetic unit connector 16 to arithmetic unit 14. In accordance with command signals on cable 72, the word may be changed or completely rewritten. It then is transmitted through connector 16, a register and connector 32 to memory 34 where it is stored in the initial location. If it is desired to change only 1 bit in the word, however, a special order is provided which requires less time to execute. The word is stored in K register 24. A command is sent from control 12 over cable 78 directly to the register. This command specifies both the register stage which is to be written into and the value of the bit. The modified word is then sent back through connector 32 and stored in memory 34. This operation is relatively fast because it is not necessary to transmit the word to be changed to arithmetic unit 14 since the change may be made directly in register 24. The K register, like the J register may be used in the same manner as the other registers but is also used for a special purpose. The operation of the data processor is more fully described in the Brass application.

Before considering the Brass program and the manner by which my program speeds up the operation, it will be helpful to list examples of various instructions which may be executed in the machine.

1. MVMR,A,X: This order controls a readout from the memory and the placing of the word read out in a specified register. Following the operation code MVMR, is an address which specifies the location in the memory whose content is to be read. In the example given a word is read out of location A. Following the address is a letter which specifies one of the system registers. In the example selected, the word in location A is read into the X register.

2. MVMR, (J−1),X: This order also controls a readout from the memory and the placing of the word read out in the specified register, in this case the X resister. The address of the location in memory whose content is read is not stated explicitly. Instead the machine examines the J register and subtracts 1 from the number stored in it. Thus if the J register contains the number 200 the data word at address 199 in the memory is read into the X register. If the term (Y+2) is contained in the instruction rather than the term (J−1), and the Y register contains the number 688, the word at address 690 is read out of the memory. An address in the memory is specified by 15 bits. A register may contain up to 23 bits but only the rightmost 15 bits are used to derive the effective address of the word to be read out of the memory. The actual coding of each instruction word does not follow the symbolic coding. The 15 least significant bits of every instruction contain a data-address field even though in the symbolic coding the data or the address may appear somewhere in the middle of the instruction. Suppose for example that the entire instruction MVMR,690,X is placed in the J register, i.e., it is to be treated as data. The address 690 occupies the 15 least significant stages in the register. Consequently if the order MVMR,(J−1),K is executed, the word stored in the memory at address 689 is read into the K register.

3. MVRM,K,A: This instruction is the converse of the first. A register word is stored in a memory location. The first letter following the operation code specifies the register. Following the register specification is an address. In the example given, the word in register K is written into location A in the memory.

4. MVRM,K,(Y+2): This instruction also controls the storage of the word in the K register in the memory. The address of the location in the memory is determined by examining the Y register. The number 2 is added to the content of the Y register to derive the effective storage address. Thus, if the Y register contains the number 800 the word in the K register is stored at address 802 in the memory. Again, only the rightmost 15 bits in the specified register are considered in the derivation of the effective address.

5. MVDKF,1,K18: This is an order which controls the writing of 1 bit in the K register. The number following the operation code is either a 0 or a 1 and represents the value of the bit to be written in the K register. Following this bit value is one of the symbols K0 through K22. Each memory word comprises 23 bits and the K register contains 23 stages. The symbol K18, for example, specifies stage 18 in the K register. Thus in the selected example a 1 is written in stage 18 of the K register.

6. IF,_,200: The IF instruction causes a test to be performed, and in accordance with the result of the test either the next instruction is executed or a transfer is made to the instruction at a specified address. Various tests are possible and for an understanding of the invention it is not necessary to consider any one in particular. For this reason the test specified in the selected example is left blank. If the test produces a first result the machine proceeds to the succeeding instruction. If the test produces a second result the machine transfers to the instruction at the specified address, in the selected example address 200.

7. NO-OP,A: If an instruction contains a NO-OP operation code the address following the code is ignored. No data processing operations are performed and the machine merely proceeds to the next instruction.

8. TSF,A,J: The TSF operation code causes the machine to transfer to the instruction at the specified address, address A in the selected example. The symbol J is included in the instruction (and in the 10th instruction, TXY) only if it is desired to utilize the J option. In such a case, the address of the next instruction, which is not executed since a transfer is being made, is stored in the J register.

9. TR,(J): When it is desired to return to the instruction whose address is contained in the J register, this second type of transfer instruction is used. This instruction causes a return to the instruction at the address previously stored in the J register.

10. TXY,SUB: This instruction is similar to the TSF instruction. A transfer is made to the instruction stored at address SUB. In addition, the two words stored in the two locations immediately following the location containing the TXY instructions itself are stored in registers X and Y respectively. This instruction is provided in order that data be available in the machine registers when a transfer is made to a subroutine.

To appreciate the advantages of my invention, the Brass program, the instructions in which are shown in FIG. 2, first will be described. Memory 34 includes a series of work lists. Only eight are shown in the illustrative embodiment of the invention. Each work list contains three words. The first work list is stored at addresses (A) through (A+2), and the first word in the list is an instruction TXY,SUB. Similarly, the second work list is stored at addresses (B) through (B+2) and the first word in the list contains the same instruction TXY,SUB. Similar remarks apply to the other six work lists. Initially, when the machine is first put into operation, data is contained in the second and third locations of each list. The word stored in the third location of each list is the address of the first location in the next list. Thus the third word at address (A+2) is B, the word stored at address (B+2) is C, etc. Since there are only eight work lists the third word in the eighth work list, stored at address (H+2), is 0. When data is first written into a work list it is written into the second and third locations of the list. The word in the third location in each work list is thus erased. This initial word in each inactive work list (an inactive work list is one which contains no data to be processed) is used for selecting an idle work list when data is to be first written in a list. Once the list is selected the third word initially in the list need not be retained.

A work location file is contained at addresses (L) through (L+7). When the machine is first put into operation a NO-OP instruction is stored at each address in the work location file, as shown in the drawing. The work location file is used to identify the location of any work list whose data must be processed. The second word initially contained in each work list is an address of a respective location in the work location file. When data is written into a work list this address is erased. The address is required however only when the work list is first selected and need not be retained once the list is activated.

Selection of a Work List for Entry of Data

Before proceeding with a description of the Brass program it will be helpful to understand the manner in which a work list is selected. In the course of the machine operation two data words are derived in registers L and Y, which data words must be processed. One of these data words for example might represent the identity of a trunk in a telephone switching system and the other might represent the state of the trunk. The processing of the data might involve the scanning of the trunk for a predetermined time interval to detect a change of state. An idle work list is selected and the two data words, in the L and Y registers, are stored in the second and third locations of the list. The list is made active. At a subsequent time the machine processes the data in all active work lists. Thus in order to write data in a work list it is necessary to maintain a record of idle lists, to choose one of them, and to change the record to indicate that it is no longer idle. One technique which may be used to select an idle work list is to maintain a "directory" or a record of each list with its active or inactive state, and to examine the record to find an inactive work list when one must be selected. This technique however requires considerable processing time. For this reason a far more efficient procedure is utilized in the program.

Only one extra location in the memory, location (HC2) is required in order to select an idle work list. When the machine is first put into operation location (HC2) contains the address of the first location in the first work list, address (A). Whenever a work list is to be seized location (HC2) is examined: Unless it contains a 0 the number in it represents the identity of the idle work list to be selected. When the idle list is selected, the address stored in its third location is written into location (HC2).

Initially all work lists are idle and all locations in the memory contain the data and instruction words shown in the drawing. The first time it is necessary to select an idle work list location (HC2) is examined. Since the number A is stored at this location the machine is instructed to select the first work list for storing the data to be processed later. The data is stored at addresses (A+1) and (A+2). Since location (A+2) initially contains the number B, this number is stored at address (HC2).

If the first work list does not become inactive, i.e., if its data is not completely processed, by the time it is necessary to select a second work list, the work list at locations (B) through (B+2) is chosen. Since the machine examines location (HC2) to select an idle list and since the number B has been stored previously at this address, the list beginning at location (B) is selected. The third word in the list, C, is then stored in location (HC2). Thus the next time a work list must be selected and location (HC2) is examined, the third work list is chosen.

Release of Work List

When the processing program determines that the data in a work list has been completely processed the list is made inactive. This is accomplished as follows. The number stored in location (HC2) is written into the third location of the now idle work list, and the address of the first location in the now idle work list is written into location (HC2). The next work list to be selected, unless another work list becomes idle, is the one which just became idle. The essence of this technique is that the third word in each idle work list identifies another idle work list. The content of location (HC2) also identifies an idle work list. When a list becomes idle the identity of the list is placed in location (HC2). Location (HC2) previously contained the identity of an idle list. In order to retain this record the list identity is stored in the third word of the list which just became inactive. Thus while initially the lists are identified in the sequence A, B, ..., H, in the course of the machine operation the chain may be changed. Suppose, for example, that the last work list to become idle is the one beginning at location (E) and consequently location (HC2) contains the number E. Suppose that the next to last list which became idle is the one beginning at location (B). Since location (HC2) contained the number B when the list beginning with location (E) became idle, when address (E) was stored in location (HC2), the content of this location, B, was stored at address (E+2). Suppose further that the other six lists are active. Assume now that the work list beginning at location (G) becomes idle. Address (G) is now stored in location (HC2) and the number E previously contained in this location is stored at address (G+2). Thus the next work list to be seized is that beginning with location (G) followed by the selection of the list beginning at location (E), which in turn is followed by the selection of the list beginning with location (B).

The eighth work list is not selected until the other seven are all in use. When the eighth list is selected since it contains the number 0 at address (H+2), the number 0 is stored at address (HC2). If an attempt is now made to seize another work list by examining location (HC2) the address identified is 0. This is an indication to the machine that there are no more idle lists and that a transfer should be made to a trouble subroutine. Suppose however that before an attempt is made to seize a ninth work list one of the eight work lists becomes idle. If the list which becomes idle is that beginning with location (D), the number D is stored at address (HC2) and the 0 previously contained at this address is stored at address (D+2). The next work list to be seized in the fourth and the 0 which is written once again in location (HC2) indicates that all work lists are in use. However suppose that after work list D becomes idle and before another work list is selected, work list A becomes idle. In such a case the number A is stored at address (HC2) and the number D previously stored at this address is stored in location (A+2). Since the next list to be selected is the one beginning with location (A), and the list after this which is selected will be the one beginning with location (D) it is seen that the 0 in location (D+2) will not be moved into location (HC2) until both idle work lists are seized. In general, because work lists are selected in an order reverse to that in which they become idle, the 0 initially in location (H+2) does not appear in location (HC2) unless all eight work lists are active.

Updating of HC1 and HC2

It will be recalled that when data is written into a work list the respective entry in the work location file is changed from a NO-OP order to a transfer order. Location (HC2) contains the identity of the work list which is to be selected next. Since there is no correspondence between the locations comprising a work list and the address of the respective work location file entry, a second record must be kept in order that the instruction in the work location file be changed when the respective work list is seized. Location (HC1) is used for storing the address of the work location file entry associated with the work list to be seized next. Thus initially since location (HC2) contains address (A), location (HC1) contains address (L). When the first work list is seized the number B is written into location (HC2). At the same time the number L+1, (stored at address (A+1), is transferred to location (HC1). Thus after the first work list is made active the content of location (HC2) identifies the B work list and the content of location (HC1) identifies the respective work location file entry at address (L+1). In this manner the proper work location file entry is always represented in location (HC1) when the respective work list is represented in location (HC2). When a work list becomes idle it will be recalled that the address of its first location is stored in location (HC2). As will be seen below at the same time the address of the respective work location file entry is stored at address (HC1). The work list identity originally in location (HC2) is stored in the third location of the work list which has just become idle. In a similar manner the work location file address originally in location (HC1) is stored in the second location in the same work list.

Selection of a Work list; Changing Operation Code in Work Location File

With these preliminary remarks the Brass program may now be examined. As the machine executes successively addressed instructions it determines that two data words must be processed. The words appear in registers L and Y. The machine transfers to the instruction at address (101) to select an idle work list and to store the two data words in its second and third locations. The first instruction executed is MVMR,HC2,J. This instruction causes the address stored in location (HC2) to be written into the J register. The next instruction executed is IF,JO,TTT. If the number in the J register is 0 all eight work lists are in use and a transfer is made to a trouble subroutine whose first instruction is stored at address (TTT). The nature of this subroutine is not essential for an understanding of the Brass program. On the other hand, if there is yet an idle work list the machine proceeds to execute the instruction at address (103). Suppose location (HC2) originally contains address (B). Consequently the number B is stored in the J register when the instruction at address (101) is executed. The instruction at address (103) is MVMR,(J+2),X. This instruction causes the data word in location (B+2) to be written into the X register. Suppose the number stored in location (B+2) is at this time F. Consequently the number F is placed in the X register. This number, the address of the first location in the next work list to be selected, must be placed in location (HC2). This is accomplished by the next instruction MVRM,X,HC2.

Since address F is placed in location (HC2) it is necessary that the address of the respective work location file entry, (L+5), be placed in location (HC1). First, the previous content of location (HC1), the address of the work location file entry associated with work list B, is placed in the X register to save it. Since location (HC2) originally contained the number B, location (HC1) initially contains address (L+1), and when the fifth instruction—MVMR,HC1,X—is executed the number L+1 is placed in the X register. (The number F previously placed in the X register when the instruction at address (103) was executed is erased, but this number is no longer required.) The sixth instruction causes the new work location file address to be placed in the Z register. When the instruction at address (101) was executed the number B was placed in the J register. Consequently the sixth instruction—MVMR,(J+1),Z—causes the content of location (B+1) to be placed in the Z register. Location (B+1) initially contains address (L+5), the work location file address associated with work list F whose identity is initially in location (B+2). The seventh instruction executed—MVRM,Z,HC1—causes the work location file address associated with work list F, address (L+5), to be placed in location (HC1) as desired.

At this point locations (HC1) and (HC2) both contain the proper addresses, that is, the addresses identifying the next work list and the respective work location file entry to be selected. Since work list B has now been seized it is necessary to change the respective entry in the work location file to indicate that the data in this work list must be processed. This entry is at address (L+1), this address having been placed in the X register during the execution of the instruction at address (105). The eighth instruction—MVMR,(X),K—causes the word at address (L+1) to be placed in the K register. The five most significant bits in this word are all 0's since the work location file entry at address (L+1) originally contains a NO–OP code to indicate that there is no data in work list B to be processed. The ninth instruction executed—MVDKF,1,K18—causes a 1 to be written in the 18th stage of the K register, changing the operation code from 00000 to 00001. In the 10th step the order MVRM,K,(X) is executed. The content of the K register is stored in the memory at the address contained in the X register, i.e., at address (L+1). The B work location file entry has thus been updated as required.

Since all necessary bookkeeping operations have been performed the machine now writes the two data words previously derived and contained in registers L and Y in the second and third locations in the B work list. Register J contains the number B, this number having been transferred from location (HC2) to the register when the instruction at address (101) was executed. When the 11th instruction—MVRM,L,(J+1)—is executed the data word in the L register is stored at location (B+1). When the 12th instruction— MVRM,Y,(J+2)—is executed the data word in the Y register is stored at address (B+2). The machine proceeds to execute the instructions beginning with that stored at address (113). The program may include a variety of loops by which the instructions at addresses 101) through (112) may be executed again and again as new pairs of data words which must be processed are derived. As each pair of data words is derived the words are stored in the second and third locations in an idle work list and the record of available work lists is updated.

Processing Work Lists; Reading Work Location File Operation Codes

At some time in the course of the program it becomes necessary to process the data contained in active work lists. At this time the instruction at address 200 is executed. This instruction—TSF,L—controls a transfer to the first instruction in the work location file. Suppose work list A is idle. Since it contains no data which must be processed the instruction at address L represents a NO–OP order. The machine proceeds to examine the instruction at address (L+1). If work list B similarly contains no data to be processed location (L+1) also contains a NO–OP order. The machine proceeds to the third work location file instruction. Suppose work list C does contain data to be processed. When the data was first written in the work list, the respective work location file entry at address (L+2) was changed from representing a NO–OP order to the instruction TSF,C,J. This instruction causes a transfer to be made to the instruction contained at address (C). Because the J option is included in the instruction the address of the next instruction, (L+3), is stored in the J register. Address (L+3) must be stored in the J register in order that the machine return to the next work location file entry after the data in work list C is processed.

The instruction contained at address (C), the one to which the machine transfers, is TXY,SUB. This instruction causes the machine to place the two data words, previously stored in locations (C+1) and (C+2) in the X and Y registers, and to transfer to the instruction at address SUB. Each work list begins with a transfer instruction in order that the same subroutine be used to process the data in each list. The instructions at addresses (SUB) through (SUB+$n$−1) control the processing of the data. The final results are stored in the L and Z registers. The details of the processing program are not essential to an understanding of the Brass program.

Before any pair of data words is completely processed the processing subroutine may have to be executed a number of times. For example, if the two data words represent the identity of a trunk in a telephone switching system and the state of the trunk, and the processing program controls the scanning of the trunk to detect a change of state, a number of scans may have to be performed in succession before a final result is determined. For this reason the instruction at address (SUB+$n$+) controls a test, the details of which are also not essential to an understanding of the Brass program. If the test indicates that the data has been completely processed the machine proceeds to the next instruction. If the test indicates that more processing is required the machine transfers to the instruction at address (SUB+$m$) to restore the data in the same work list. No matter which path the machine takes following the test it must know the identity of the work list from which the initial two data words were retrieved. For this reason before the test is performed the instruction at address (SUB+$n$) is executed. This instruction causes the address of the first location in the work list to be stored in the Y register.

It will be recalled that the TSF instruction at address (L+2) includes the J option. Consequently when the machine transferred to the instruction at address (C) the address (L+3) was stored in the J register. The TXY transfer instruction at address (C) does not include the J option and consequently when the machine transfers to the processing subroutine address (L+3) is still retained in the J register. Thus when the instruction at address (SUB+$n$) is executed, this instruction being MVMR,(J−1),Y, the machine examines the address in the J register and subtracts 1 from it. The data word stored at this modified address, (L+2), is sent to the Y register. The word stored at address (L+2) is the instruction word TSF,C,J. This word is treated as data and sent to the Y register. As described above the 15 least significant bits of an instruction always contain the address specified in the instruction. Consequently the number C comprises the 15 least significant bits at address (L+2) and therefore now these bits are placed in the 15 least significant stages in the Y register. This number, C, identifies the particular work list to which the data in the L and Z registers must be returned.

Suppose the test controlled by the instruction at address (SUB+$n$+) determines that the processing of the data is not complete. The machine transfers to the instruction at address (SUB+$m$). This instruction—MVRM,L,(Y+1)—tells the machine to store the L register data word in the memory at the location whose address is equal to the sum of the content of the Y register and 1. Since the number C is contained in the first 15 stages of the Y register the L register data word is sent back to the C work list and stored at address (C+1). In a similar manner when the next order—MVRM,Z,(Y+2)—is executed the second data word, contained in the Z register, is stored in location (C+2). Since the data in the C work list has been processed the machine must return to the work location file to determine if the data in the D work list must be processed. The next instruction executed is TR,(J). The J register still has in it the address (L+3). This instruction causes the machine to return to the instruction which is the fourth entry in the work location file. This instruction contains either a NO-OP or TSF operation code depending on whether the D work list is active. If it is, address (L+4) is stored in the J register and the machine transfers to the instruction at address (D). This instruction—TXY,SUB—similarly controls a transfer to the processing subroutine. This sequence continues until the data in all active work lists are processed.

Release of a Work List; Changing Operation Code in Work Location File

Returning now to the processing program suppose the test controlled by the instruction at address (SUB+$n$+1) reveals that the data contained in the L and Z registers has been completely processed. In such a case this data must be directed to specified storage locations in memory or to the peripheral units. In addition, certain bookkeeping operations must be performed, specifically, the work list initially containing the data which was processed must be deactivated. This last function is accomplished by the instructions at addresses (SUB+$n$+) through (SUB+$n$+10).

The MVMR,HC2,X instruction causes the address stored in location (HC2) to be placed in the X register. This address, which identifies the idle work list which would have been selected next had the C work list not just become idle, must be stored in location (C+2). The address is first put in the X register. The address of the respective work location file entry must be stored in location (C+1). This address is first put in the K register with the execution of the order MVMR,HC1,K.

It will be recalled that when the instruction at address (SUB+$n$) was executed the TSF,C,J instruction at address (L+2) was stored in the Y register, the 15 least significant bits in this register representing the number C. The instruction at address (SUB+$n$+4) is MVRM,X,(Y+2). This instruction causes the content of the X register, which represents the idle work list identity previously contained in location (HC2), to be stored at address (C+2); the next instruction—MVRM,K,(Y+1d)—causes the content of register K, which represents the respective work location file entry previously contained in location (HC1), to be stored at address (C+1). The two instructions at addresses (SUB+$n$+4) and (SUB+$n$+5) control the updating of the work list just made idle, that is, the placing in the second and third locations in this work list of the identities of the idle work list and the respective work location file entry previously contained in locations (HC1) and (HC2).

It is now necessary to place in location (HC2) the address of the first location in the work list which has just become idle, work list C, and to place in location (HC1) the address of the respective entry in the work location file, address (L+2). The Y register contains the word TSF,C,J. When the instruction MVRM,Y,HC2 is executed this entire word is stored in location (HC2). The 15 least significant bits represent the number C. Although 8 additional bits are stored in location (HC2), which bits are not required to identify the C work list, these bits are in the eight most significant positions in the storage location. Since the content of location (HC2) is used only to identify an idle work list when data is first stored in a work list, only the 15 least significant bits are examined and consequently the 8 most significant bits now stored in location (HC2) do not enter subsequent computations.

The next instruction which is executed is MVRM,J−1,HC1. The J register still contains address (L+3). Address (L+2) is stored in location (HC1) to identify the third entry in the work location file to go along with the identity of work list C in location (HC2). At this point in the processing program the updated entries have been stored in the second and third locations of the work list which has just become idle and in locations (HC1) and (HC2). The only remaining operation required is the updating of the entry in the work location file at address (L+2) to indicate that the work list is idle in order that the processing program skip over this instruction in subsequent cycles. The entry at address (L+2) is changed from a TSF instruction to a NO-OP instruction by the next three instructions in the processing program. The J register still contains address (L+3). When instruction MVMR,(J−1),K is executed the content of location (L+2) is placed in the K register. This instruction must be changed to represent a NO-OP order. When instruction MVDKF,O,K18 is executed the bit in stage 18 of the K register is changed from a 1 to a 0, i.e., the five most significant bits in the register now represent a NO-OP operation code rather than a transfer operation code. When the instruction at address (SUB+$n$+10) is executed, the instruction being MVRM,K,(J−1), the K register word is returned to location (L+2). In subsequent executions of the processing program the NO-OP order at address (L+2) will cause the machine to go on directly to the examination of the fourth work location file entry.

All bookkeeping operations have now been completed. The L and Z registers contain the processed data which must be directed to either the peripheral units, the control, or stored in the memory depending on the nature of the data and the processing program itself. The instructions between addresses (SUB+$n$+) and (SUB+$m$−2) direct the data to wherever it is required, the particular instructions not being essential to an understanding of the Brass program. The next instruction which is executed is TR,(J). The J register contains address (L+3) and the machine proceeds to examine the work location file entry which is associated with work list D to determine if there is any data in this work list to be processed.

The eight entries in the work location file are sequentially examined and a transfer is made to the processing program whenever an entry indicates that the respective work list contains data which must be processed. The last entry examined is that at address (L+7). If the work location file represents a transfer order a transfer is made to the address (H) followed by a transfer to the processing program. A return is then made to the instruction at address (L+8). If the instruction at address (L+7) contains a NO-OP operation code the machine goes immediately to the instruction at address (L+8). The instruction at this address is TSF,201. This instruction causes the machine to transfer to the instruction at address (201). It will be recalled that the machine first executes the program which controls the writing of data in the work lists. When it is time to process this data the instruction at address (200) is executed to control the sequential examination of the work location file entries. After these entries have been examined and the data has been processed a return is made to the instruction at address (201) in order that the machine continue executing the instructions following the point in the program where the transfer to the work location file was effected.

The previously considered program allows the data processor to easily determine which work lists contain data which must be processed. The bookkeeping operations however are time-consuming. The subroutines used to select an idle work list and to select a work list to be deactivated when its data had been completely processed are rapid but a considerable time is spent in activating and deactivating the work lists. This is due primarily to the fact that when a list is activated the contents of two locations, (HC1) and (HC2), must be updated.

Similarly, when a list becomes idle the contents of these two locations must be transferred to the work list itself and two new addresses must be stored in these locations. Because each change in the record requires consideration of the address of a work location file entry as well as the address of the respective list, a relatively large amount of time is used for record keeping. In accordance with my invention the record keeping is far less time-consuming.

Integration of Alternative Form of Work Location File Entry into a Work List

In accordance with my invention the work lists are not randomly distributed with respect to the work location file entries. In fact there is no separate work location file. Each work list is preceded by an instruction which is equivalent to the respective entry in the Brass work location file. Moreover, the work lists are not randomly distributed in the memory but follow each other in sequence. Referring to FIG. 3 it is seen that each work list comprises four locations rather than three. The first location is the equivalent of the Brass work location file entry except that when the machine is first place in operation, i.e., when all work lists are idle, the NO–OP/TSF instruction at the head of each list contains a TSF code. The second location in each work list contains an instruction similar to the first in the Brass work list. The third and fourth locations in each work list are those in which data is written. Both of these locations in the Brass work list contain addresses when the work list is idle. In my invention only the second of these locations, the fourth in the list, contains an address.

The eight successive work lists, stored at addresses (A) through (A+27) form a recognizable pattern. The B list begins at location (A+4) and for this reason location (A+4) is also shown as being 0 (B). Similarly, since the C list begins at location (A+8) this location is also represented as location (C), etc. The second instruction in each work list is SUB,J. Except for the inclusion of the J option this instruction is the same as the first in each of the Brass work lists. The first instruction in work list A initially controls a transfer to the first instruction in work list B. The first instruction in work list B initially represents a transfer to the first instruction in work list C, etc. Since there are no work lists following work list H the instruction at address (H) controls a transfer to address 201, this transfer being described below.

The fourth location in each work list contains the address of the first word in another work list. Initially address (B) is stored in location (A+3), address (C) is stored in location (A+7), etc., with a 0 being stored in the last word of work list H. In the course of activating and deactivating work lists the address in the last location of each work list is changed. Initially however the address (B) in the fourth location of work list A indicates that work list B is idle, address (C) in the fourth location of work list B indicates that work list C is idle, etc. Location (HC) initially contains address (A) to indicate that work list A is idle. Location (HC) serves the same purpose as location (HC2) in the Brass program. Whenever a work list must be seized location (HC) is examined to determine the identity of the next list to be activated. The address contained in the fourth location of this list is written into location (HC) before it is overwritten by the data to be processed. Similarly, when a work list becomes idle the address of its first location is written into location (HC) and the address previously contained in location (HC) is written into the fourth location of the now idle work list. The use of location (HC) and the addresses contained in the fourth locations of all idle work lists is identical to the use of location (HC2) and the addresses contained in the third locations of all idle work lists in the Brass program. Again, the idle work list to be selected may be identified always by examining the content of the same location, and if a 0 is represented in this location, it is an indication that there are no more idle work lists.

The basic distinction between the memory layout in the Brass program and the layout in my program is that each NO–OP/TSF instruction word is the first instruction in the respective work list, and the work lists are stored in sequence. Because of the work list layout of my invention the address of each NO–OP/TSF instruction may be determined together with the addresses of the other three locations in the list. The advantage of my invention will become apparent upon consideration of the following detailed description of the program itself.

In the course of its operation the data processor derives two data words in registers L and Y which must be stored in a work list for subsequent processing. The program used for this storage operation begins with the instruction at address (101). This instruction is MVMR,HC,J. The address contained in location (HC) is placed in the J register. This address is that of the first location in the work list to be selected. Again, a test must be performed to determine if there is an idle work list. Accordingly, the second instruction executed controls a transfer to a trouble subroutine starting at address (TTT) if the J register contains a 0. If there is an available work list the machine continues to execute the instruction at address (103). Suppose location (HC) initially contains address (B) which indicates that the B work list is the next one to be selected. Thus the number B is stored in the J register when the instruction at address (101) is executed. It is necessary to place a new address in location (HC), namely, the address contained in the fourth location of work list B. Suppose work list B indicates that the next idle work list to be selected is work list H. In such a case location (A+7) contains the number H. When the instruction MVMR,(J+3),X is executed, since the J register contains the number B which is equal to address (A+4), the content of location (A+7) is placed in the X register. Thus the number H appears in register X. When the next instruction MVRM,X,HC is executed address H is placed in location (HC) to indicate that work list H is the next to be selected. It should be noted that the four instructions in my program just described are similar to the four equivalent instructions in the Brass program. The major difference is that the address identified by the instruction at address (103) is (J+3) rather than (J+2). This is due to the fact that the identity of the next idle work list is contained in the fourth location of each work list in my invention whereas it is contained in the third location in each work list in the Brass invention.

The next three instructions in the Brass program are used to update location (HC1) with the address of the work location file entry associated with the next work list to be selected. These instructions need not be executed in my program since once a work list is identified so is its "work location file" entry, this entry always being the first word in the work list itself.

In the Brass program after the content of location (HC1) is updated the work location file entry is changed to represent a transfer order to indicate that the data in the respective work list must be processed. This is also necessary in my invention although for reasons to be described below when a work list is made active the first instruction in the list is changed to represent a NO–OP order rather than a TSF order. The three instructions at addresses (108) through (110) in the Brass program are used to change the work location file entry. In my program three instructions are also required to change the equivalent instruction word. The instruction at address (105) is MVMR,(J),K. The address of the first word in the selected work list was placed in the J register during the execution of the instruction at address (101). Consequently when the instruction at address (105) is executed the first word in the selected work list, the NO–OP/TSF entry, is placed in the K register. The next instruction—MVDKE,O,K18—changes the bit in stage 18 of the K register from a 1 to a 0, i.e., changes the operation code from TSF to NO–OP. The next instruction—MVRM,K,(J)—restores the changed NO–OP/TSF entry in the first location of the B work list.

As in the Brass program two instructions are required to write the two data words in the L and Y registers into the selected work list. Since the J register contains the address of the first word in the list, the two data words must be written at addresses (J+2) and (J+3). The data is written in the third and fourth locations of the selected work list with the execution of the two orders, MVRM,L,(J+2) and MVRM,Y,(J+3).

Between successive executions of the processing program the instructions between addresses (101) and (109) may be executed over and over again, depending on how many pairs of data words must be written in idle work lists. For each pair of data words which must be written in a work list in the Brass program 12 instructions must be executed. For each pair of data words which must be written in a work list in my program only nine instructions must be executed. This is due to the fact that the Brass program requires three instructions to update the content of location (HC1). In my program there is no need to provide a location whose content identifies a work location file entry. Accordingly there is no need to provide a location equivalent to (HC1) and only nine instructions must be executed rather than 12 each time data is written in a work list.

In the Brass program when it is time to process the data in active work lists the instruction at address (200) is executed. This instruction controls a transfer to the first entry in the work location file. In my program when it is time to process the work list data instruction (200) is executed. This instruction controls a transfer to the instruction at address (A), this instruction being the NO-OP/TSF entry for the first work list.

If work list A contains no data which requires processing the first instruction in the work list is TSF,B. This instruction controls a transfer to the first instruction in the B work list. If this work list similarly contains no data requiring processing its first instruction is TSF,C. A transfer is made to the first instruction in the C work list etc. On the other hand, suppose a work list such as B has had data written into it which requires processing. In such a case the first instruction in the list is NO-OP,C. When this instruction is examined, e.g., after a transfer is made from the instruction at address (A), the machine merely skips over the instruction and goes on to the next at address (A+5). This instruction is TXY,SUB,J which controls a transfer to the subroutine which processes the data in the third and fourth locations of the work list. It will be recalled that the first instruction in each of the Brass work lists is TXY,SUB. The same instruction is provided in my work lists to control a transfer to the processing subroutine. The use of the J option in the instruction will be described below. Before considering the data processing subroutine however it should be noted that the use of the No-OP and TSF instructions in my program is the opposite of their use in the Brass program. In the latter a NO-OP instruction indicates that the respective work list contains no data to be processed and allows the machine to examine the next work location file entry. A TSF instruction, on the other hand, indicates that the respective work list contains data which must be processed and controls a transfer to the work list which in turn controls a transfer to the processing subroutine. In my program a TSF instruction indicates that the respective work list contains no data to be processed. The TSF instruction causes the machine to skip over the work list and go on to the next. On the other hand, if a work list contains data to be processed the first word in the list is a NO-OP instruction allowing the machine to proceed to the next instruction in the list which controls the transfer to the processing subroutine.

The use of the J option in the TXY,SUB,J instruction in my program is necessary because the machine must make a record of the work list whose NO-OP/TSF entry has just been examined in order to identify the work list. In the Brass program a record is made of the respective entry in the work location file because the NO-OP/TSF instruction includes the J option. Consequently in the Brass program there is no need for the J option in the TXY,SUB instructions. In my program the J option is provided in the TXY,SUB instructions rather than the NO-OP/TSF instructions since when a transfer is made as the result of a NO-OP/TSF instruction representing a transfer order, the respective work list is not processed and there is no reason to maintain a record of the work list identity. The list is processed when the NO-OP/TSF entry represents a NO-OP order and in such a case there is no J option. Consequently the J option is included in the next instruction.

Consider now the processing program itself. Suppose the NO-OP/TSF instruction at address (B) is examined and the B work list contains data which must be processed. Since the instruction at address (B) represents a NO-OP order the machine proceeds to execute the instruction at address (A+5). This instruction controls three operations. First, the two data words previously stored in locations (A+6) and (A+7) are placed in the X and Y registers. Second, address (A+6) is placed in the J register, and finally a transfer is made to the instruction at address (SUB). As in the Brass program the instructions contained at addresses (SUB) through (SUB+$n$+) control the processing of the data placed in the X and Y registers and the storage of the resulting data in the L and Z registers.

The machine then proceeds to execute the instruction at address (SUB+$n$). A test is performed to determine if the data has been completely processed. If it has not, a transfer is made to the instruction at address (SUB+$m$) to control the restorage of the data at addresses (A+6) and (A+7). The instruction at address (SUB+$m$) is MVRM,L,(J). The J register contains address (A+6) and consequently the data word in the L register is stored in the second location of the B work list. The next instruction which is executed—MVRM,Z,(J+1)—causes the data word in the Z register to be stored in the fourth location of the B work list. The next instruction executed is TR,(J+2). This instruction causes a return to the instruction at address (A+8), the NO-OP/TSF entry for the C work list. Thus the instructions which control the restorage in the work list of data which has not been completely processed are equivalent to the same instructions in the Brass program.

Suppose however that the data in the B work list has been completely processed. In such a case after the instruction at address (SUB+$n$) is executed a transfer is not made to the instruction at address (SUB+$m$) and instead the machine proceeds to execute the next instruction at address (SUB+$n$+1). Since work list B has to be made idle, address (B) must be stored in location (HC) and the content of (HC) must be stored in the fourth location of the B work list. When instruction MVMR,HC,X is executed the address in location (HC) is stored in the X register. The next instruction—MVRM,(J–2),HC—causes the number B to be placed in location (HC) to identify the B work list as the next one to be selected. The next instruction—MVRM,X,(J+1) causes the address previously stored in location (HC) and now contained in the X register to be placed in the fourth location of the B work list. Since the J register contains address (B+2), the instruction at address (SUB+$n$+) causes the previous address contained in location (HC) to be stored in the fourth location of the B work list.

The three instructions at addresses (SUB+$n$+1) through (SUB+$n$+) are the only ones required to update the record of available work lists. In the Brass program the seven instructions at addresses (SUB+$n$) and (SUB+$n$+2) through (SUB+$n$+) are required for the same purpose. Consequently only three instructions must be executed in my program rather than seven to update the record of available work lists. This is due to the fact that with my memory layout only one location, (HC), is required to identify both a work list and its NO-OP/TSF entry whereas in the Brass program two such locations, (HC1) and (HC2), are required for this purpose.

The next three instructions are equivalent to the three instructions in the Brass program which change the NO-OP/TSF instruction to indicate that the work list is idle. The J register contains address (A+6). When instruction MVMR,(J–2),K is executed the instruction NO-OP,C at address (B) is placed in the K register. The next instruction—MVDKF,1,K18,—changes the NO-OP code to a TSF code, and the next instruction—MVRM,K,(J–2)—restores the NO-OP/TSF instruction, now representing a transfer order, at address (B).

Since the data has been completely processed the instructions at addresses (SUB+$n$+7) through (SUB+$m$−2) direct the data to wherever it is required in the data processor. The next instruction which is executed—TR,(J+2)—causes a transfer to the NO–OP/TSF entry for the next work list.

The machine continues to examine the head word in each work list. Each instruction either follows the data in the list to be processed or controls a transfer to the next list. Since list H is the last in the series, if it is idle the TSF instruction at address (H) controls a transfer to address (201) to allow the program to continue at the point from where it first transferred to the work list series. If work list H contains data to be processed location (H) contains a NO–OP instruction. The machine proceeds to execute the next instruction which controls a transfer to the processing subroutine. After the processing the instruction at address (SUB+$m$−1) or (SUB+$m$+2) controls a transfer to address (A+28). The instruction at this address in turn controls a transfer back to the main program at address (201).

Thus it is seen that because of the memory layout in my invention it is possible with a single address to identify both a work list and its respective NO–OP/TSF instruction. All that is required is that a NO–OP instruction identify an active work list rather than an idle work list, and a TSF instruction identify an idle work list rather than an active work list. By so doing it is possible to activate a work list by executing three fewer instructions, and to deactivate a work list by executing four fewer instructions, than are required in the Brass program.

Although the invention has been described with reference to a particular embodiment it is to be understood that this embodiment is only illustrative of the application of the principles of the invention, and that numerous modifications may be made therein and other arrangements may be devised without departing from the spirit and scope of the invention.

What I claim is:

1. A method for operating a data processor; said data processor including memory locations for storing instructions, a series of groups of memory locations for storing data to be processed, means for controlling normally the sequential execution of instructions stored in successively addressed memory locations, and writing means for storing and changing instructions and data in said memory locations; comprising the steps of:

1. controlling said writing means to store in the first memory location of each of said groups an instruction containing both an operation code normally representing a transfer order and a transfer address which is the address of the first memory location in the succeeding group in said series,
2. controlling said writing means to store data which is to be processed in a selected one of said groups of memory locations, said data being stored in locations in said group other than the first,
3. controlling said writing means to change the operation code in the first location in said selected group to represent a no-operation code when said data is stored,
4. controlling said instruction execution means to transfer to the instruction contained in the first location in the first group in said series of groups at the beginning of each time interval in a repetitive series of time intervals, and
5. controlling said writing means to selectively change the operation code in the first memory location in any group back to a transfer order representation after the data in the respective group is processed.

2. A method for operating a data processor; said data processor including memory locations for storing instructions, a series of groups of memory locations for storing data to be processed, means for controlling normally the sequential execution of instructions stored in successively addressed memory locations, and writing means for storing and changing instructions and data in said memory locations; comprising the steps of:

1. controlling said writing means to store in the first memory location of each of said groups an instruction containing both an operation code normally representing a transfer order and a transfer address which is the address of the first memory location in the succeeding group in said series,
2. controlling said writing means to change the operation code in the first location in each of said groups which contains data requiring processing to represent a no-operation code,
3. controlling said instruction execution means to transfer to the instruction contained in the first location in the first group in said series when it is time for the data in said groups to be processed, and
4. controlling said writing means to change the operation code in the first memory location in any group back to a transfer order representation when the data in said group no longer requires processing.

3. A method for operating a data processor; said data processor including memory locations for storing instructions, a series of groups of memory locations for storing data to be processed, means for controlling normally the sequential execution of instructions stored in successively addressed memory locations, and writing means for storing and changing instructions and data in said memory locations; comprising the steps of:

1. controlling said writing means to store in the first memory location of each of said groups an instruction containing both an operation code normally representing a transfer order and a transfer address which is the address of the first memory location in the succeeding group in said series,
2. controlling said writing means to store data which is to be processed in a selected one of said groups of memory locations, said data being written in locations in said group other than the first,
3. controlling said writing means to change the operation code in the first location in said selected group to represent a no-operation code when said data is stored, and
4. controlling said writing means to selectively change the operation code in the first memory location in any group back to a transfer order representation after the data in the respective group is processed.

4. A method for operating a data processor; said data processor including memory locations for storing instructions, a series of groups of memory locations for storing data to be processed, means for controlling normally the sequential execution of instructions stored in successively addressed memory locations, and writing means for storing and changing instructions and data in said memory locations; comprising the steps of:

1. controlling said writing means to store in the first memory location of each of said groups an instruction containing both an operation code normally representing a transfer order and a transfer address which is the address of the first memory location in the succeeding group in said series,
2. controlling said writing means to change the operation code in the first location in each of said groups which contains data requiring processing to represent a no-operation code, and
3. controlling said writing means to change the operation code in the first memory location in any group back to a transfer order representation when the data in said group no longer requires processing.

5. A method for operating a data processor; said data processor including memory locations for storing instructions, respective areas of memory locations for storing data to be processed, means for controlling normally the sequential execution of instructions stored in successively addressed memory locations, and writing means for storing and changing instructions and data in said memory locations; comprising the steps of:

1. controlling said writing means to store an instruction in each of said memory areas, said instruction identifying another one of said memory areas and containing either a no-operation or a transfer operation code, and
2. controlling said writing means to change the operation code in each of said instructions back and forth between said no-operation and transfer codes depending on whether the data in the respective memory area is to be processed.

6. A method for operating a data processor in accordance with claim 5 wherein said memory location areas are in sequence in the data processor memory and each of said instructions identifies the succeeding memory location area.

7. A method for operating a data processor in accordance with claim 5 further including the step of:

3. controlling said instruction execution means to transfer to and execute the no-operation or transfer instruction contained in a first one of said memory locations areas when it is time for the data in said memory location areas to be processed.

8. A method for operating a data-processor in accordance with claim 5 wherein the data processor includes means for changing a single bit in a memory word, said no-operation and transfer operation codes differ in only one bit position, and the bit in said one bit position is changed back and forth between a 0 and a 1 during step (2).

9. A process comprising a new use of a stored program data processing apparatus including an addressable memory unit;

writing means for storing data words and instruction words in said memory unit;

means for controlling normally the sequential execution of instructions stored in memory locations having successive addresses;

means for transferring to an instruction stored at a particular address as the result of executing said instructions;

means for storing in a particular location (HC) the first address of a group of associated words into which data to be processed may be written, said group of words normally including one word for indicating the location of the first word of another group of words in said memory unit into which data to be processed may be written; said new use being the selective modification of the operation code of an instruction stored in said one word incident to the selection and release of the words of said associated group to indicate whether there is information in said group to be processed or whether said location of said first word of said another group of words is to be addressed, comprising the steps of:

1. controlling said writing means to store in said one word an instruction containing both an operation code normally representing a transfer order and a transfer address which is the address of the first memory location in said another group of said words,
2. controlling said writing means to change the operation code from said transfer order to a no-operation order when data is written in said group of words, said no-operation order causing the instruction stored in the word having the next successive address to said one word to be executed, and
3. controlling said writing means to change the operation code from said no-operation order to said transfer order when said data in said group of words has been completely processed.